United States Patent [19]
Yura et al.

[11] Patent Number: 5,177,860
[45] Date of Patent: Jan. 12, 1993

[54] MANUFACTURING METHOD OF MAGNETIC HEAD

[75] Inventors: Shinsuke Yura; Mitsuo Inumochi; Tomohiro Fukuichi, all of Amagasaki, Japan

[73] Assignee: Mitsubishi Denki Kabushiki Kaisha, Japan

[21] Appl. No.: 744,297

[22] Filed: Aug. 13, 1991

[30] Foreign Application Priority Data

Aug. 28, 1990 [JP] Japan .................................. 2-227371

[51] Int. Cl.⁵ ................................................ G11B 5/42
[52] U.S. Cl. ........................................ 29/603; 360/103
[58] Field of Search ................... 29/603; 360/103, 104

[56] References Cited

U.S. PATENT DOCUMENTS

| | | | |
|---|---|---|---|
| 3,460,244 | 8/1969 | Metz | 29/603 |
| 4,489,484 | 12/1984 | Lee | 29/603 |
| 4,761,699 | 8/1988 | Ainslie et al. | |
| 4,789,914 | 12/1988 | Ainslie et al. | |

FOREIGN PATENT DOCUMENTS 63-149888 6/1988 Japan .

Primary Examiner—Carl E. Hall
Attorney, Agent, or Firm—Wolf, Greenfield & Sacks

[57] ABSTRACT

A manufacturing method of a magnetic head wherein forming plural belleville springs in the same arrangement as that of plural head sliders formed on a single slider wafer and bonding the belleville springs to the slider wafer, then cutting the slider wafer into individual head sliders thereby to obtain many head sliders having the belleville springs respectively.

14 Claims, 8 Drawing Sheets

52

MANUFACTURING METHOD OF MAGNETIC HEAD

BACKGROUND OF THE INVENTION

1. Field of the Invention

This invention relates to a method for manufacturing a magnetic head used in a magnetic disc drive, a magnetooptical disc drive, etc.

2. Description of Related Art

In order to improve productivity of magnetic heads, the prior art conventionally arranged a plurality of head elements constituting a magnetic circuit for the magnetic head on a slider wafer. However, processing of a slider has been conducted for every head after the individual heads are separated from each other.

FIG. 1 is a perspective view illustrating the conventional manufacturing process of the magnetic heads, wherein reference 1 designates a slider wafer, reference 2 is a plurality of head elements formed in arrays on the slider wafer 1, reference 30 is an array of head sliders without being processed, reference 31 is an array of head sliders obtained by processing the head slider array 30, reference 40 is a head slider cut out from the head slider array 31, and reference 5 indicates a suspension spring for suspending the head slider 40. FIG. 2 is an enlarged view of the head slider 40 with air bearing surfaces 41 and tapered parts 42.

The manufacturing process of the magnetic head will be discussed below. A plurality of head elements 2 are formed in arrays on the slider wafer 1 through photolithography. The slider wafer 1 is then cut into a plurality of unprocessed head slider arrays 30. Each of the unprocessed head slider arrays 30 is processed through ion beam etching or machining, etc. to define the air bearing surfaces 41 and tapered parts 42, thereby obtaining the processed head slider arrays 31. Subsequently, each processed head slider array is cut into individual head sliders 40 and the suspension spring 5 is mounted on the opposite surface to the air bearing surface 41 of the head slider 40.

Since the magnetic heads are conventionally manufactured in the foregoing manner, although many head sliders are produced at one time, it is necessary to mount the suspension spring on each head slider after cutting the head slider array into individual head sliders. Therefore, productivity of the magnetic heads is disadvantageously low.

SUMMARY OF THE INVENTION

This invention has been devised to solve the above-noted disadvantages inherent in the prior art, and has for its essential object to provide a method for manufacturing a plurality of magnetic heads having suspension members respectively at one time, by forming a plurality of the suspension members corresponding to a plurality of head sliders at one time, bonding the plurality of suspension members to a wafer where the plurality of the head sliders are formed, then cutting the wafer into individual head sliders.

The above and further objects and features of the invention will more fully be apparent from the following detailed description with accompanying drawings.

DESCRIPTION OF THE PREFERRED EMBODIMENTS

A manufacturing method according to one preferred embodiment of this invention will be described with reference to the accompanying drawings.

It is to be noted here that the description below is related to the method of manufacturing a horizontal head having a bearing surface formed in parallel to a slider wafer surface.

Figure 1:
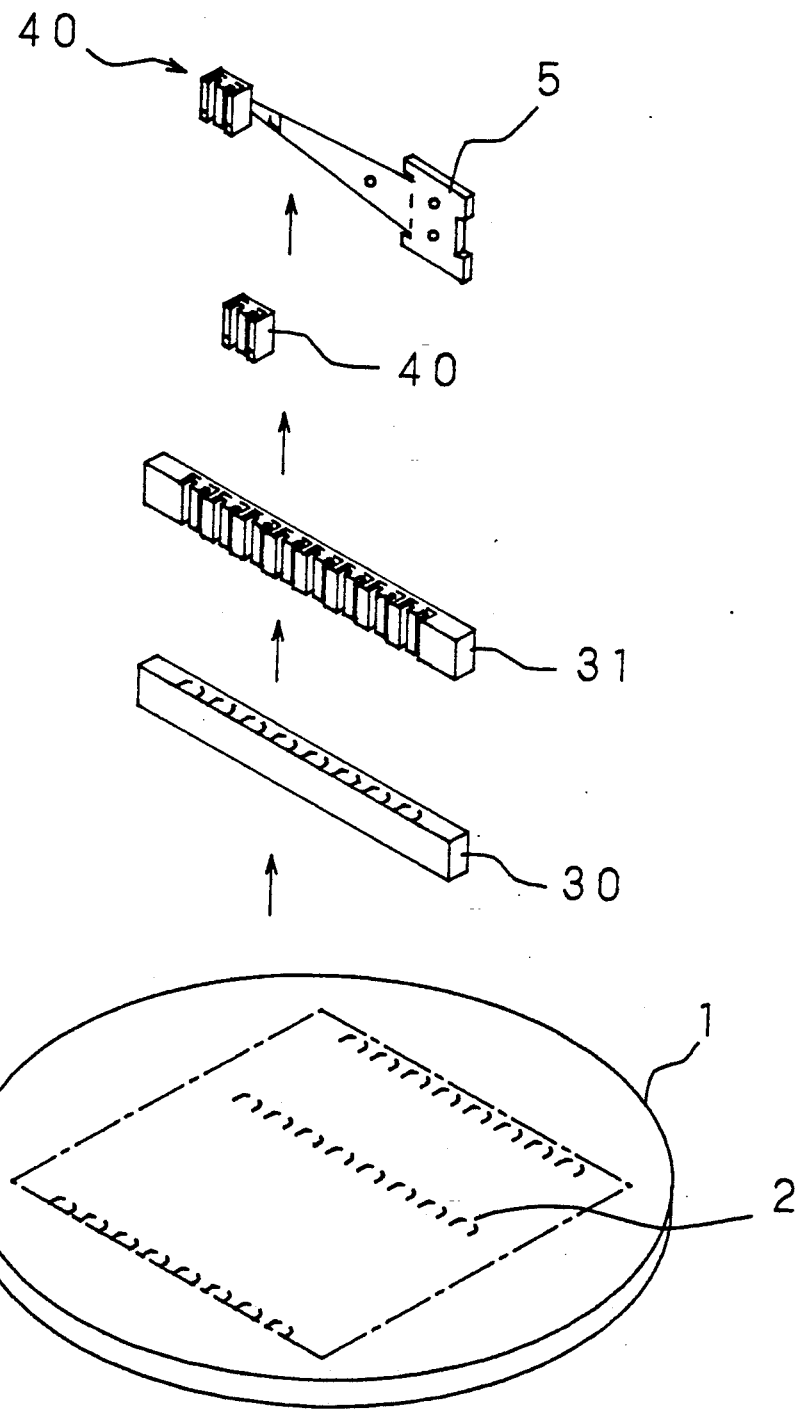
FIG. 1 is a perspective view of a conventional manufacturing process of a magnetic head.
Figure 2:
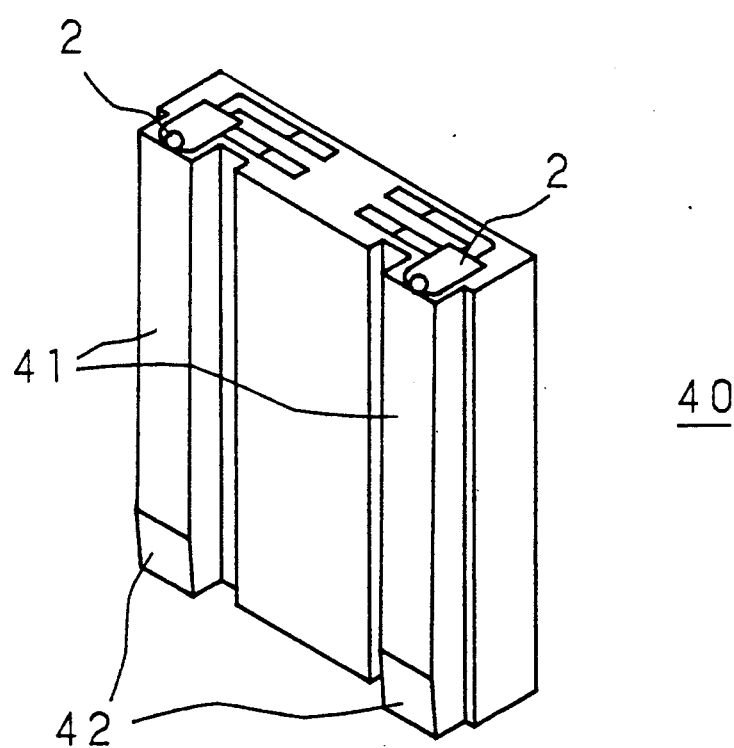
FIG. 2 is a perspective view of an individual head slider.
Figure 3:
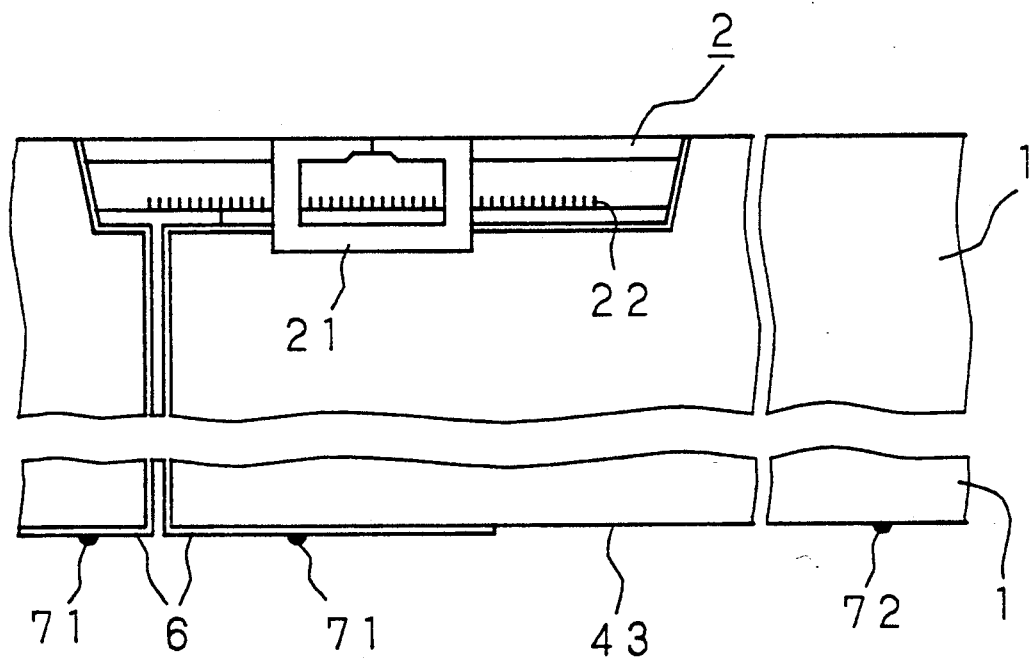
FIG. 3 is a fragmentary plan view and a side view of a slider wafer.

How to manufacture the horizontal head referred to above is revealed, for example, in "A New Thin Film Head Generation IC Head" by J. P. Lazzarri and P. Deroux-Dauphin IEEE Transactions on Magnetics Vol. 25, No. 5 (1989) A manufacturing method of the horizontal head according to this invention will be explained with reference to FIG. 3. In the upper half of FIG. 3 is shown a plan view of a slider wafer, while in the lower half in FIG. 3 is shown a side elevational view of the slider wafer. In the first place, a magnetic pole 21 and a coil 22 are formed on a silicon slider wafer 1 through photolithography, thereby to obtain a plurality of head elements 2 formed in matrix. Then, bearing surfaces 41 and tapered parts 42 are formed for each of the head elements 2 all over the slider wafer 1 through ion beam etching or the like. The surface where a suspension member for the head element 2 is mounted is opposite to the surface where the bearing surfaces 41 are formed, that is, the reverse side of the slider wafer 1.

Next, gimbal springs are formed in matrix corresponding to the arrangement of the head elements 2 on the slider wafer 1 and bonded to the reverse side 43 of the slider wafer 1. It is desirable that each gimbal spring has the size equal to or smaller than the head slider, e.g., such a spiral belleville spring, although of a smaller size, as is disclosed in the Japanese Patent Application Laid-Open No. 63-149888 (1988) is used.

Figure 4:
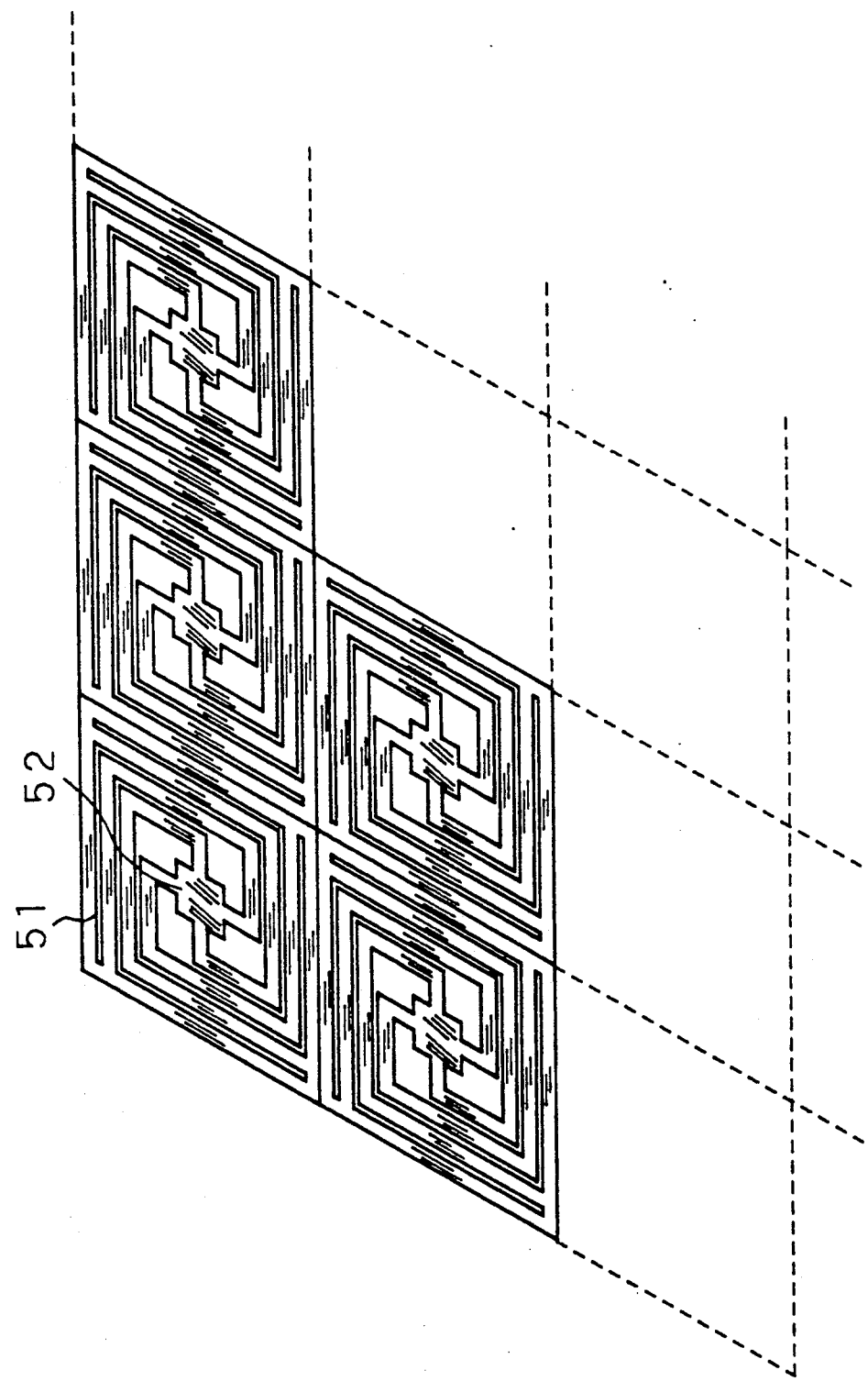
FIG. 4 is a perspective view of one embodiment of a spiral belleville spring used in a manufacturing method of this invention.

FIG. 4 is a perspective view of gimbal springs formed in matrix as mentioned above. In FIG. 4, reference 51 indicates a spiral belleville spring and reference 52 denotes a bonding part of the gimbal spring to the head slider. Thus, many head sliders equipped with springs respectively are obtained at one time by cutting the slider array into individual head sliders. In other words, since the suspension springs are arranged in the same manner as that of the head sliders by repeating the pattern of the spring corresponding to the size of the head sliders, it is possible to obtain many sliders with springs at one time.

Figure 5:
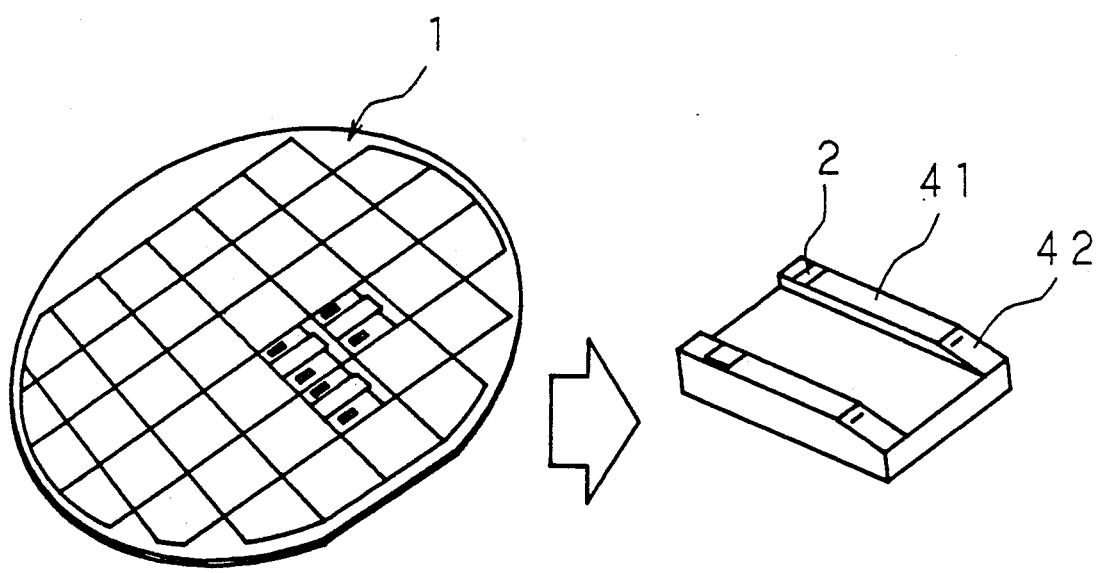
FIG. 5 is a perspective view of a slider wafer and head elements.

FIG. 5 is a perspective view of the slider wafer 1 and head elements 2.

Figure 6:
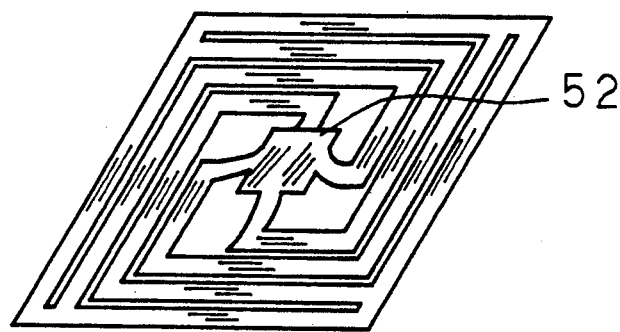
FIG. 6 is a perspective view of another embodiment of a belleville spring used in the manufacturing method of this invention.

FIG. 6 is a perspective view of a suspension spring of another embodiment used in the manufacturing method of this invention. In the embodiment of FIG. 6, the bonding part 52 protrudes out from the spiral belleville spring 51 in the periphery thereof, and therefore the suspension spring can be bonded to the head slider easier.

Next, another method for manufacturing magnetic heads where a conductor pattern is formed on the head suspension member will be discussed hereinafter.

Figure 7:
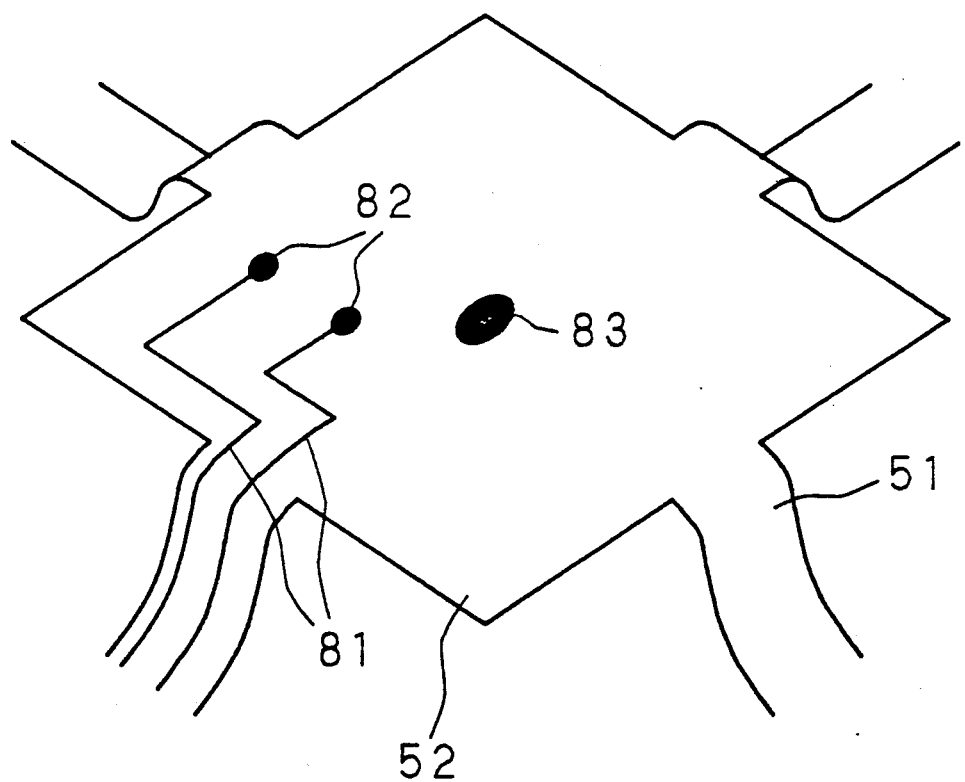
FIG. 7 is a perspective view of a further embodiment of a belleville spring used in the manufacturing method of this invention.

With reference to FIGS. 3 and 7, reference 6 is a lead from the coil 22 and reference 71 is a solder bump for the lead. The solder bump is disclosed in detail, for example in "Bare Chip Packaging around COB, TOB Packaging" by Technical Information Association (1990). In FIG. 7, reference 81 indicates a conductor pattern, reference 82 denotes an island-shaped land soldered to be electrically conductive to the coil 22. In the instant embodiment, forming the leads of the head elements 2 can be made simultaneously for every wafer in the same manner as bonding the suspension members to the head sliders. Reference 83 is a land for bonding the head slider, having no function of electric conductivity. The land 83 is formed at a position corresponding to the solder bump 72 of FIG. 3.

As described above, according to the present embodiment, the leads from the head elements can be formed at the same time with bonding the suspension members to the head sliders owing to the assembling process using the solder bumps. Therefore, the manufacturing process is much more simplified.

Figure 8:
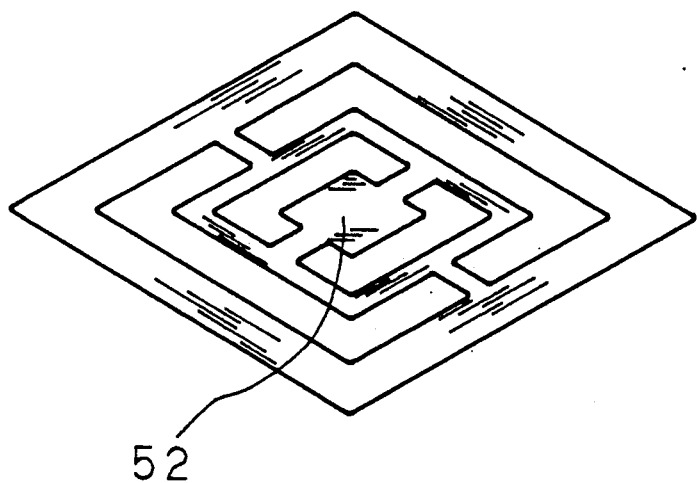
FIG. 8 is a perspective view of a still further embodiment of a belleville spring used in the manufacturing method of this invention.

Although the spiral belleville spring is used as the gimbal spring in the foregoing embodiment, this invention is not restricted to this and a belleville spring generally used in a flexible disc drive as shown in FIG. 8 may be employed. In this case as well, if the spring is rendered equal in size to the slider and arranged in matrix as in FIG. 4, the same effect as above can be achieved.

Moreover, the present embodiment is directed to the case of the horizontal head where the bearing surfaces are parallel to the slider wafer surface, but this invention is applicable to a manufacturing method of a head having the bearing surfaces vertical to the slider wafer surface. In this case, a plurality of head sliders having suspension members respectively can be obtained at one time by forming the suspension members of the size suitable to the heads in arrays and bonding them to the surface opposite to the bearing surfaces of the head slider arrays.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A manufacturing method of a magnetic head which includes a head slider for lifting a head element off a recording medium, and a suspension member for suspending the head slider from an arm of an actuator for actuating the magnetic head, comprising the steps of:

providing a single wafer having a plurality of head sliders disposed in a predetermined positional arrangement;

forming a plurality of suspension members in a positional arrangement matching that of the head sliders;

bonding the plurality of suspension members formed in said arrangement to said wafer; and cutting said wafer bonded with said suspension members into a plurality of individual head sliders each provided with a suspension member.

2. A manufacturing method of a magnetic head as set forth in claim 1, wherein said step of forming a plurality of suspension members provides suspension members each constituted by a bonding part to be bonded with the wafer and a spring part arranged in the periphery of said bonding part.

3. A manufacturing method of a magnetic head as set forth in claim 2, wherein said step of forming the plurality of suspension members provides suspension members having said bonding part projected from said spring part, and said step of bonding the plurality of suspension members includes bonding the projecting side of said bonding part with said wafer.

4. A manufacturing method of a magnetic head as set forth in claim 1, wherein said head element includes a lead and wherein said method further comprises a step of forming a conductor on said each suspension member for said lead from said head element after forming said suspension members.

5. A manufacturing method of a magnetic head as set forth in claim 1, wherein said step of forming a plurality of suspension members forms a plurality of gimbal springs.

6. A manufacturing method of a magnetic head as set forth in claim 5, wherein said step of forming a plurality of gimbal springs forms a plurality of gimbal springs each having a size equal to or smaller than said head slider.

7. A manufacturing method of a magnetic head as set forth in claim 4, wherein the step of bonding the plurality of suspension members includes simultaneously forming a conductive path comprising said conductor on said each suspension member and said lead from said head element.

8. A manufacturing method of a magnetic head as set forth in claim 1, wherein said step of providing a single wafer having a plurality of head sliders provides a single wafer having a plurality of head sliders of the horizontal head type.

9. A manufacturing method of a magnetic head as set forth in claim 1, wherein said step of providing a single wafer having a plurality of head sliders provides a single wafer having a plurality of head sliders of the vertical head type.

10. A manufacturing method of a magnetic head as set forth in claim 1, wherein said step of providing a single wafer comprises photolithography to obtain the plurality of head elements and ion beam etching to form one or more bearing surfaces for said head element.

11. A manufacturing method of a magnetic head as set forth in claim 2, wherein said step of forming a plurality of suspension members each constituted by a bonding part and a spring part further provides a solder bump on said bonding part.

12. A manufacturing method of a magnetic head as set forth in claim 1, wherein said step of providing a single wafer having a plurality of head sliders provides a single wafer having a plurality of head sliders in a matrix positional arrangement.

13. A manufacturing method of a magnetic head as set forth in claim 1, wherein said step of forming a plurality of suspension members forms a plurality of interconnected suspension members.

14. A manufacturing method of a magnetic head which includes a head slider for lifting a head element including a lead off a recording medium, and a suspension member for suspending the head slider from an arm of an actuator for actuating the magnetic head, comprising the steps of:

provnding a single wafer having a plurality of head sliders in a predetermined positional arrangement, each head slider provided with a solder bump;

forming in a positional arrangement matching that of the head sliders a plurality of suspension members each constituted by a bonding part with a solder bump and a spring part arranged in the periphery of the bonding part;

forming a conductor on said each suspension member;

bonding the plurality of suspension members formed in said arrangement to said wafer by bonding said solder bumps of said plurality of head sliders with said solder bumps of said plurality of suspension members, wherein a conductive path is simultaneously formed for each head slider suspension member pair constituted by said conductor and said lead; and cutting said wafer bonded with said suspension members into a plurality of individual head sliders each provided with a suspension member.

* * * * *